Dec. 22, 1959     L. O. CARLSEN     2,917,974
BEVEL GEAR GENERATING MACHINE
Filed Sept. 18, 1958     3 Sheets-Sheet 1
FIG. 1
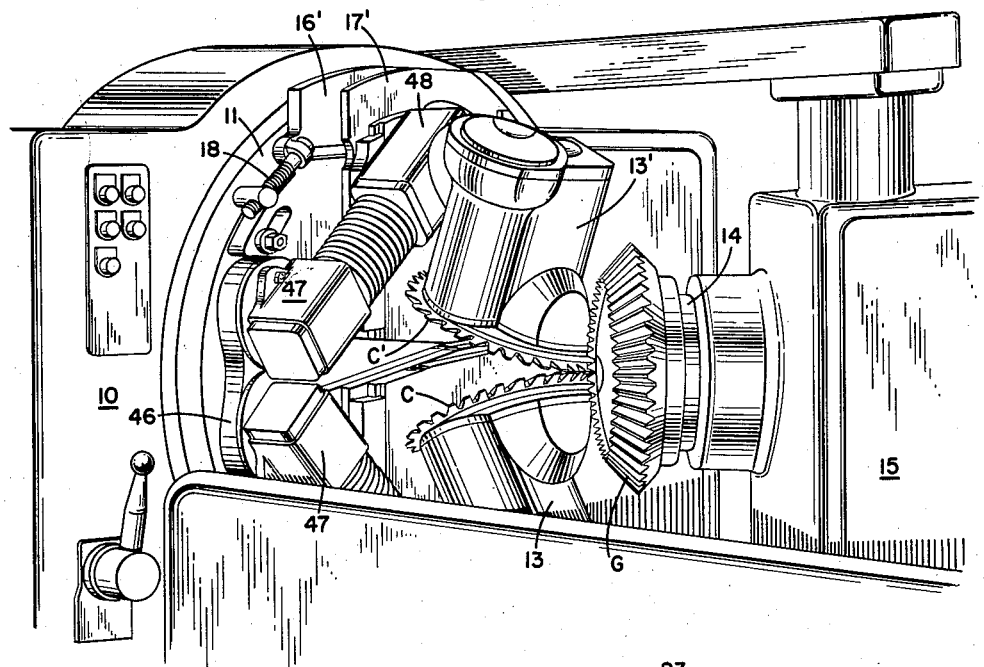
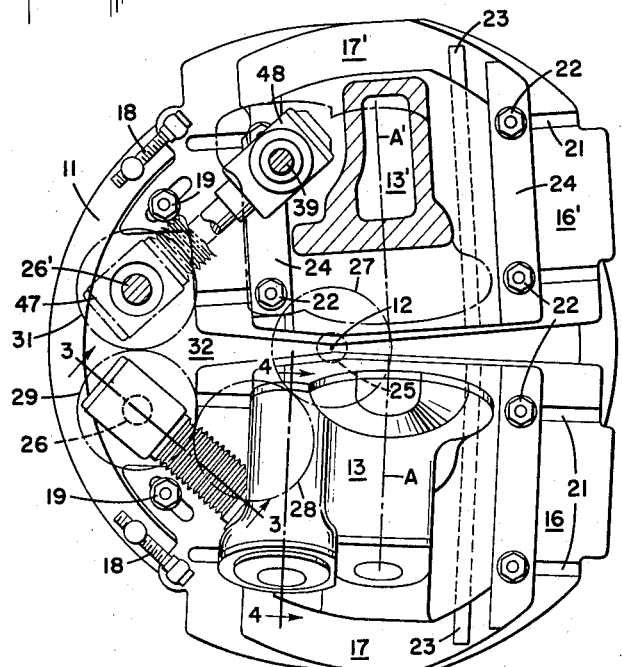
FIG. 2
INVENTOR.
LEONARD O. CARLSEN
BY
Richard W. Treverton
ATTORNEY Dec. 22, 1959         L. O. CARLSEN         2,917,974
            BEVEL GEAR GENERATING MACHINE
Filed Sept. 18, 1958                    3 Sheets-Sheet 2
FIG. 3
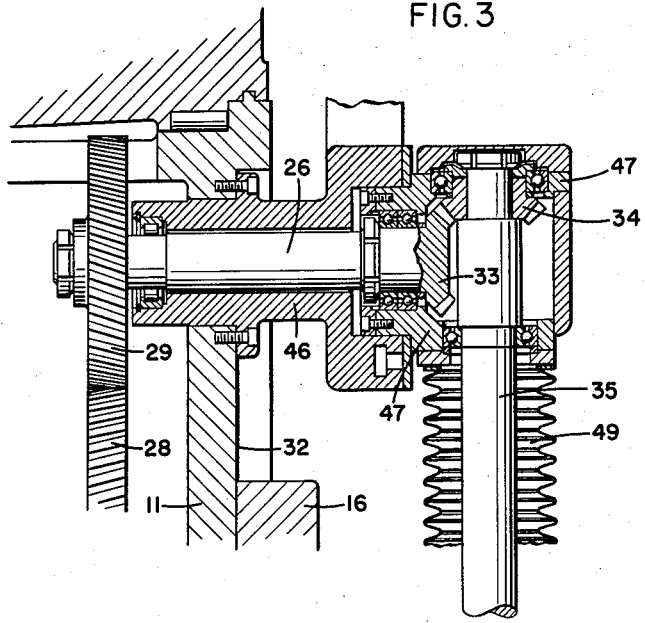
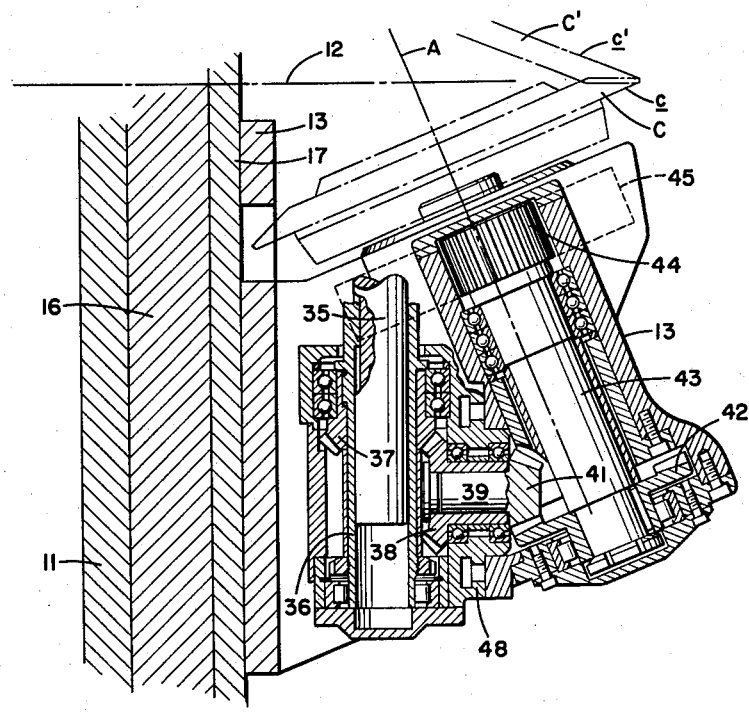
FIG. 4

Dec. 22, 1959     L. O. CARLSEN     2,917,974
BEVEL GEAR GENERATING MACHINE
Filed Sept. 18, 1958     3 Sheets-Sheet 3

United States Patent Office 2,917,974
Patented Dec. 22, 1959

2,917,974

BEVEL GEAR GENERATING MACHINE

Leonard O. Carlsen, Rochester, N.Y., assignor to The Gleason Works, Rochester, N.Y., a corporation of New York Application September 18, 1958, Serial No. 761,787

7 Claims. (Cl. 90—3)

The present invention relates to machines for generating gears, especially straight or skew bevel gears, with milling cutters.

The cutters of such a machine usually are carried by a cradle which is rotated in time with rotation of the work gear, the cutters representing a tooth of a generating gear that is rolling in mesh with the work gear. In order to represent generating gears of various designs the cutter heads which support the cutters on the cradle must be adjustable to various positions and the cutter drive train must be adapted to accommodate such adjustment. In conventional machines the cutters are driven from a power driven shaft journaled coaxially in the cradle, the drive from this shaft being through bevel gears and radially disposed telescoping shafts whose outer ends are geared to the cutter spindles, as shown in my Patent 2,567,273, granted September 11, 1951. The ability of the telescoping shafts to change in length, and to pivot about the axis of the power driven shaft, permits adjustment of the cutter heads on the cradle. However the known arrangement does not provide the range of adjustment necessary for the cutters to represent generating gears of certain designs. This is especially so in the case of skew bevel gears which requires the cutters to be arranged asymmetrically on the cradle. Moreover in the known arrangement the telescoping shafts are disposed within the cradle. This necessitates a drive connection, from the outer end of each telescoping shaft to the cutter spindle, which extends through an opening in the front face of the cradle. These openings necessarily become larger as the range of adjustment is increased, and, to accommodate skew bevel gears which otherwise would be well within the capacity range of a machine of given size, would so mutilate the cradle and the structure for supporting the cutter heads adjustably thereon as to be impractical if not impossible from a structural standpoint.

A primary object of the present invention is to obviate these limitations and to simplify the design and the assembly of the cradle and the parts carried thereby. A machine according to the invention comprises a rotatable cradle having a power driven shaft journaled for rotation coaxially therein, a cutter head mounted on the cradle and journaling a spindle for a milling cutter, with the spindle axis disposed at an acute angle to the plane of rotation of the cradle, a spindle drive shaft rotatable in the head on an axis parallel to the cradle axis and geared to the spindle for driving the same, an intermediate shaft journaled in the cradle on an axis parallel to the cradle axis and remote from said power driven shaft and from said spindle drive shaft, a gear connection between the power driven shaft and the intermediate shaft, and a gear-and-shaft connection between the intermediate shaft and the spindle drive shaft, the last-mentioned connection comprising a telescoping shaft perpendicular to the intermediate shaft and spindle drive shafts and being connected to each of them by a pair of bevel gears. Preferably one end of the intermediate shaft projects forwardly through the front face of the cradle, and the gear-and-shaft connection is disposed forwardly of the front face of the cradle and includes a bevel gear on the projecting shaft end.

This arrangement eliminates entirely the large openings in the front face of the cradle which heretofore have been required and simplifies the structure which supports the cutter head or cutter heads for adjustment on the cradle. In the present machine the means for so adjusting each cutter head comprises a tooth-angle adjusting plate which is adjustable on the cradle about the cradle axis, a cone-distance adjusting plate which is adjustable rectilinearly on the tooth-angle adjusting plate in a direction perpendicular to the cradle axis, and means whereby the cutter head may be adjusted rectilinearly on the cone-distance adjusting plate in a direction perpendicular to both the cradle axis and the direction of the cone-distance adjustment.

The foregoing and other objects and advantages will appear from the following description of the typical embodiment of the invention shown in the accompanying drawings, wherein:

Fig. 1 is a fragmentary perspective view of the machine, showing the cradle and the cutters carried thereby in cutting relation to a work gear;

Fig. 2 is a front elevation of the cradle with one cutter head removed and with some parts shown in section;

Figure 5:
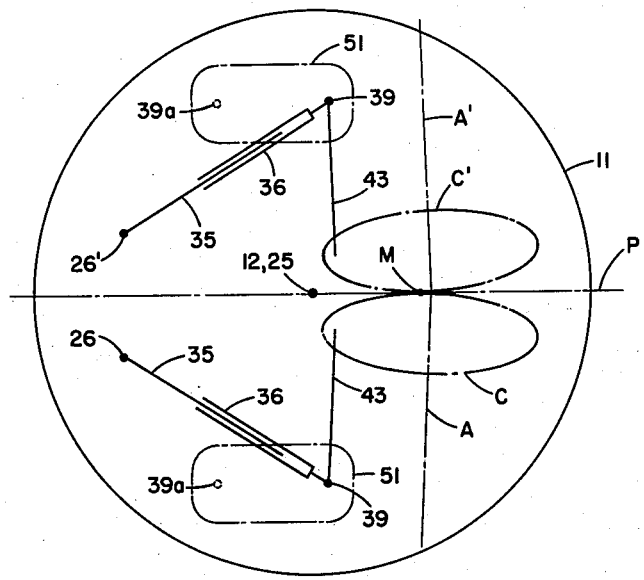
Figure 6:
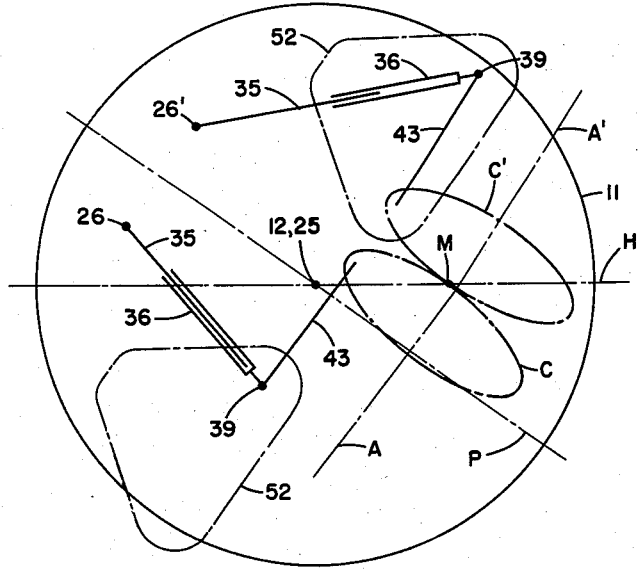

Figs. 3 and 4 are fragmentary sectional views respectively in planes 3—3 and 4—4 of Fig. 2; and Figs. 5 and 6 are diagrammatic views in the same plane as Fig. 2, illustrating the relationship of the telescoping shafts to the related structure in two different positions of adjustment of the cutter heads.

The machine comprises a frame 10 supporting a cradle 11 for rotation about a horizontal axis 12. The cradle carries a pair of cutter heads 13 and 13' each journaling the supporting spindle of a disc shaped milling cutter, respectively C or C'. The blades of the cutters intermesh so that both cutters operate in the same tooth space of the work gear G, and their side cutting edges, disposed in planes $c$ and $c'$ in Fig. 4, represent the sides of a tooth of a generating gear whose axis is the cradle axis 12. As will be understood from Fig. 4 the axes A and A' of the respective cutter spindles extend at an acute angle to the plane of rotation of the cradle. The work gear G is mounted on a spindle 14 journaled for rotation in a work head 15 on an axis which intersects the cradle axis. The work head is adjustable on the frame 10 so as to accommodate gears of different size and pitch angle, and is also movable on the frame to withdraw the gear G from the tools to permit tooth-to-tooth indexing. The cradle 11 is connected to the work spindle 14 by a suitable reversing gear train, whereby the generating gear and gear G are rotated back and forth in mesh with each other during the tooth cutting operation. By means of a suitable index mechanism (not shown) associated with the gear train, the tooth-to-tooth indexing occurs at a time during the cutting cycle of each tooth when the work gear is withdrawn clear of the cutters.

For adjusting the cutters on the cradle, to represent a generating gear of desired design, a pair of tooth-angle adjusting plates 16 and 16', and a pair of cone-distance adjusting plates 17 and 17', are provided. Plates 16 and 16' are independently adjustable on the cradle 11 about axis 12 by means of screws 18 after first loosening clamp bolts 19 which extend through arcuate slots in the plates. Cone-distance adjusting plates 17, 17' are respectively adjustable perpendicularly to the cradle axis 12 on the plates 16, 16', along T-slots 21 in the latter, after first loosening clamping T-bolts 22. The cutter heads 13, 13' are respectively adjustable on plates 17, 17' along guide tongues 23, which are perpendicular both to T-slots 21 and to the cradle axis. As shown, the bolts 22 extend through gibs 24 which hold the cutter heads to the plates 17, 17', so that upon loosening of these bolts the cutter heads are freed for vertical adjustment on the plates. By such adjustment the cutters may be made to represent a tooth, of any desired thickness, of a generating gear which ordinarily will be in the form of either a straight or skew bevel crown gear.

The drive for the cutters is from a power driven shaft 25 which is journaled for rotation in the cradle about cradle axis 12, and is driven by any suitable means, not shown. A pair of parallel intermediate shafts 26, 26' are journaled in the cradle in parallelism with axis 12 and as remote from the latter and the respective cutter heads 13, 13' as is feasible. These intermediate shafts are connected to shaft 25 by a gear train comprising gear 27 on shaft 25 and within the cradle, gear 28 journaled on a shaft fixed to the cradle, gear 29 on shaft 26 and gear 31 on shaft 26'. The forward ends of shafts 26, 26' extend forwardly beyond the front face 32 of the cradle and each has integral therewith a bevel pinion 33 meshing with a gear 34 on one section 35 of a telescoping shaft whose other section, 36, carries a bevel pinion 37. As shown, the telescoping shaft 35, 36 extends at right angles to the cradle axis 12 and its two sections are keyed together so as to rotate in unison. Pinion 37 meshes with a bevel gear 38 on a spindle drive shaft 39 journaled in the related cutter head 13 or 13'. Each of the spindle drive shafts 39 is parallel to cradle axis 12 and has integral therewith a bevel pinion 41 meshing with a bevel gear 42 on a countershaft 43 journaled in the cutter head on an axis parallel to the respective cutter spindle axis A or A'. Each counter shaft carries a spur pinion 44 driving a gear 45 on the cutter spindle.

Shaft 26 is journaled in anti-friction bearings carried by a bracket 46 (omitted in Fig. 2) secured to the cradle and by a swivel bracket 47 rotatable in the bracket 46 about the axis of the shaft. Bracket 47 also carries anti-friction bearings for gear 34 and telescoping shaft section 35. Similarly the other telescoping shaft section, 36, and pinion 37 are journaled in anti-friction bearings in a swivel bracket 48 which is rotatable in head 13 about the axis of shaft 39. Anti-friction bearings for shaft 39 are mounted in bracket 48. A protective bellows-like flexible tube 49 extends around each telescoping shaft 35, 36 and is anchored at its ends to the adjacent brackets 47 and 48.

The two cutter heads 13, 13' and the gear drive connecting their cutter spindles to respective shafts 26, 26' are symmetrical to each other with reference to a plane of symmetry disposed between them, namely a horizontal plane through axis 12 in Fig. 2. Because of this, and the fact that gears 29, 31 cause shafts 26, 26' always to rotate oppositely, adjustment of the cutter heads does not affect the angular relationship of the interlocking cutters C, C'. When adjusted to cut straight bevel gears the heads are usually disposed symmetrically on the cradle with reference to the plane of symmetry, but for skew bevels they must of course be arranged asymmetrically. Even in the latter case the relatively great length of the telescoping shafts permits adjustments of the heads to accommodate gears over a wide range as to cone distance, tooth angle and skew offset.

Fig. 5 shows the symmetrical relationship of the upper and lower telescoping shafts 35, 36 with reference to the plane of symmetry P when the cutters C, C' are adjusted for cutting a straight bevel gear. Plane P contains the mean effective point M of the cutters and is horizontal when the cradle is in the middle of its generating roll about axis 12. The cutter spindle drive shafts 39 are well within the cylindrical periphery of the cradle 11 and are at a distance from power driven shaft 25 sufficiently great that they could be driven by telescoping shafts radiating from shaft 25, in the manner disclosed in aforementioned Patent 2,567,273. Adjustment of the cutters for cutting smaller bevel gears for the most part requires only adjustments of shafts 39 to the left, in directions nearly parallel to plane P, say to positions 39a, and this does not decrease but in fact slightly increases the radial distance 39—12. Radial telescoping shafts therefore could be arranged within the cradle, as shown in the patent, and shafts 39 could extend through aligned openings in the cradle and in the tooth-angle adjusting plates 16, 16' and cone-distance adjusting plates 17, 17' since these openings could be relatively small. Such openings in the cradle might be of about the size indicated at 51 and still accommodate the necessary adjustments for cutting straight bevel gears of different sizes and tooth numbers.

However for cutting skew bevel gears the cutters C, C' must be arranged asymmetrically of the plane P as is shown in Fig. 6, and, to bring the cradle to the middle positioning of its generating roll, the cradle must be rotated about axis 12 through an angle relative to horizontal plane H sufficient to bring the mean point M of the cutters into the horizontal plane. In this situation the upper shaft 39 lies too close to the cradle periphery to permit it to extend through the front wall of the cradle to drive means located within the cradle, and the lower shaft 39 is too close to shaft 25 to be connected to it by a radially disposed telescoping shaft. Furthermore the openings through the cradle, to accommodate adjustments necessary for cutting gears of different sizes and hand (a right-hand skew pinion being capable of meshing only with a left-hand skew gear), would have to be approximately of the size shown at 52. These and the aligned openings in the adjusting plates would so mutilate the cradle and the plates as to be impractical from a structural standpoint. In fact such openings would be possible only if the cradle and the plates were greatly enlarged. Thus the invention, by eliminating openings for the shafts 39 in the cradle and in the adjusting plates, and by also avoiding a radial disposition of the telescoping shafts, greatly increases the capacity of a gear cutting machine of given size.

Having now described the preferred embodiment of the invention, what I claim is:

1. A gear cutting machine comprising a rotatable cradle having a power driven shaft journaled for rotation coaxially therein, a cutter head mounted on the cradle and journaling a spindle for a milling cutter, with the spindle axis disposed at an acute angle to the plane of rotation of the cradle, a spindle drive shaft rotatable in the head on an axis parallel to the cradle axis and geared to the spindle for driving the same, an intermediate shaft journaled in the cradle on an axis parallel to the cradle axis and remote from said power driven shaft and from said spindle drive shaft, a gear connection between the power driven shaft and the intermediate shaft, and a gear-and-shaft connection between the intermediate shaft and the spindle drive shaft, the last-mentioned connection comprising a telescoping shaft perpendicular to the intermediate and spindle drive shafts and being connected to each of them by a pair of bevel gears.

2. A machine according to claim 1 in which one end of the intermediate shaft projects forwardly through the front face of the cradle, and the gear-and-shaft connection is disposed forwardly of the front face of the cradle and includes a bevel gear on the projecting shaft end.

3. A machine according to claim 1 having, for the purpose of adjusting the cutter head on the cradle, a tooth-angle adjusting plate adjustable on the cradle about the cradle axis, a cone-distance adjusting plate adjustable rectilinearly on the tooth-angle adjusting plate in a direction perpendicular to the cradle axis, and the cutter head adjustable rectilinearly on the cone-distance adjusting plate in a direction perpendicular to both the cradle axis and the direction of the cone-distance adjustment.

4. A gear cutting machine comprising a rotatable cradle having a power driven shaft journaled for rotation coaxially therein, a pair of cutter heads mounted on the cradle and each journaling a spindle for a milling cutter, with the spindle axis disposed at an acute angle to the plane of rotation of the cradle, a spindle drive shaft rotatable in each head on an axis parallel to the cradle axis and geared to the spindle in the head for driving the same, a pair of intermediate shafts journaled in the cradle on different axes, parallel to the cradle axis and remote from both the cradle axis and the spindle drive shafts, a gear connection between the power driven shaft and the intermediate shafts, and a gear-and-shaft connection between each of said intermediate shafts and a respective spindle drive shaft, each of the last-mentioned connections comprising a telescoping shaft perpendicular to the related intermediate shaft and spindle drive shaft and being connected to each of them by a pair of bevel gears.

5. A machine according to claim 4 in which said gear connection is arranged to drive said intermediate shafts in opposite directions, and the gearing between each intermediate shaft and the spindle driven by it is symmetrical, with respect to a plane of symmetry containing the cradle axis, to the gearing between the other intermediate shaft and the spindle driven by it.

6. A machine according to claim 4 in which one end of each of the intermediate shafts projects forwardly through the front face of the cradle, and the gear-and-shaft connections are disposed forwardly of the front face of the cradle and each of them includes a bevel gear on the projecting end of the related intermediate shaft.

7. A machine according to claim 4 having, for the purpose of adjusting the cutter heads independently on the cradle, a pair of tooth-angle adjusting plates adjustable independently of each other on the cradle about the cradle axis, a cone-distance adjusting plate adjustable rectilinearly on each tooth-angle adjusting plate in a direction perpendicular to the cradle axis, and each cutter head adjustable rectilinearly on a respective cone-distance adjusting plate in a direction perpendicular to both the cradle axis and the direction of the related cone-distance adjustment.

References Cited in the file of this patent
UNITED STATES PATENTS
2,824,498    Baxter et al. _____ Feb. 25, 1958